(12) United States Patent
Eisenbeiss et al.

(10) Patent No.: US 6,492,471 B1
(45) Date of Patent: Dec. 10, 2002

(54) METHOD FOR PRODUCING BEAD POLYMERS

(75) Inventors: Friedhelm Eisenbeiss, Weiterstadt (DE); Joachim Kinkel, Guldental (DE); Hans-Daniel-Jakob Müller, Münster (DE)

(73) Assignee: Merck Patent Gesellschaft mit Beschraenkter Haftung (DE)

( * ) Notice: Subject to any disclaimer, the term of this patent is extended or adjusted under 35 U.S.C. 154(b) by 0 days.

(21) Appl. No.: 09/959,679

(22) PCT Filed: Apr. 25, 2000

(86) PCT No.: PCT/EP00/03677

§ 371 (c)(1),
(2), (4) Date: Nov. 5, 2001

(87) PCT Pub. No.: WO00/68300

PCT Pub. Date: Nov. 16, 2000

(30) Foreign Application Priority Data

Apr. 25, 2000 (DE) .......................... 199 20 794

(51) Int. Cl.⁷ ........................... C08F 2/12; C08G 77/00
(52) U.S. Cl. ................. 526/88; 526/317.1; 526/329.7; 526/336; 526/909; 528/10; 528/425; 536/63
(58) Field of Search ................ 526/88, 909, 317.1, 526/329.7, 336; 528/10, 425; 536/63

(56) References Cited

U.S. PATENT DOCUMENTS

| | | | |
|---|---|---|---|
| 5,244,734 A | | 9/1993 | Shigeru |
| 5,886,112 A | * | 3/1999 | Vuillemin et al. ............ 526/64 |
| 5,902,834 A | | 5/1999 | Porrvik |

FOREIGN PATENT DOCUMENTS

| | | | |
|---|---|---|---|
| EP | 0 542 051 A1 | * | 5/1993 |
| JP | 05-132567 A | * | 5/1993 |
| WO | WO 99/19386 | * | 4/1999 |

OTHER PUBLICATIONS

WPI Abstract AN 1993–208895 of JP 05 132567 A.*
Patent abstracts of Japan vol. 013, No. 556 (c–664), Dec. 11, 1989 and JP 01 230420.
Patent abstracts of Japan vol. 015, No. 072 (c–0808) Feb. 20, 1991) & JP 02 296711.

* cited by examiner

*Primary Examiner*—Fred Teskin
(74) *Attorney, Agent, or Firm*—Millen, White, Zelano & Branigan, P.C.

(57) ABSTRACT

A continuous process for the preparation of inorganic and organic bead polymers using a static micromixer is disclosed. The bead polymers obtainable by the process according to the invention have a very uniform particle size distribution, which can be set in a range of between 0.1 and 300 μm.

13 Claims, 6 Drawing Sheets

METHOD FOR PRODUCING BEAD POLYMERS

The invention relates to a process for the preparation of bead polymers.

Bead polymers are employed, for example, as ion exchangers, adsorber resins, chromatography supports, catalysis supports, polymeric reagents, imprinting polymers or as support materials for combinatorial chemistry, peptide or oligonucleotide synthesis and for cosmetic applications. The preparation of bead polymers of this type, i.e. spherical organic or inorganic particles, such as, for example, spherical silica gels, is relatively complex. Bead polymers are typically prepared in stirred-tank reactors with addition of emulsifiers, with the monomers being dispersed by turbulent pressure variations or viscous shear forces to give small droplets, which adopt a spherical shape under the influence of interfacial tension. If the reaction batch is enlarged, it becomes increasingly difficult to control the temperature programme and particle generation during mechanical dispersion. The particles formed become non-uniform with respect to their particle size distribution, and their network structure becomes inhomogeneous. Small particles below 30 $\mu$m are virtually impossible to produce owing to the high dispersion energies. Alternative methods in which small particles are generated by growing nanoparticles are usually time-consuming and expensive.

A far more advantageous method, particularly for production on an Industrial scale, is performance of the reaction continuously. In this way, even large amounts can be produced with uniform product quality. In the area of bead polymerisation, there are numerous approaches for continuous reactors. The majority of the approaches use a continuously operated stirred-tank reactor, as described, for example, in various designs in Encyclopaedia of Polymer Science and Engineering, 1986, Volume 6, pages 11–18. DE 196 34 450 describes various further approaches. One possibility is offered by the use of tubular stirred reactors, which, through the formation of Taylor rings, ensure improved mixing perpendicular to the flow direction. Highly exothermic reactions can be carried out using empty tubular reactors.

However, there is still no process of this type which is used on a large industrial scale. The reasons for this are apparently difficulties in establishing the desired bead size distribution, the formation of coagulate and caking in dead spaces, and the necessity to achieve the fastest and most effective mixing possible.

It has been attempted to overcome the disadvantages described through a multiplicity of measures, such as optimisation of the reactor dimensions and use of reactors having curved to helically coiled tubes or tubular reactors having a plurality of successive bends with alternating bend direction, as described, for example, in DE 196 34 450. However, there has hitherto been no success in developing a generally applicable continuous process for bead polymerisation. The attempts that have been carried out show merely an improvement in the Bodenstein number, which is a measure of the width and symmetry of the residence-time distribution. The problems of coagulation, particle size distribution and increased space-time yield have not been solved. This applies in particular to the preparation of inorganic bead polymers.

The object of the present invention is therefore to provide a process which enables bead polymers to be prepared in a continuous procedure, with particle size range which can be set to a specific value, improved yield and more uniform quality.

It has been found that the use of novel high-performance micromixers in combination with a simple collection vessel in which the solidification and/or polymerisation reaction is carried out enables and at the same time greatly improves continuous bead polymerisation.

The process according to the invention is based on the mixing of liquid streams of suitable, usually immiscible component solutions in a micromixer, giving spherical particles in a continuous procedure with extremely improved volume yield, large particle yield with particle size range which can be set to a specific value, simplified temperature programme and reduced consumption of chemicals.

The invention therefore relates to a process for the preparation of bead polymers in which two liquid streams of immiscible or sparingly miscible component solutions, with optional supply of further component streams, are mixed in a micromixer and reacted directly or subsequently.

In addition, a preferred embodiment of the process according to the invention comprises connection of one or more ancillary devices to a first micromixer.

In addition, a preferred embodiment of the invention comprises the use of component solutions without addition of emulsifiers and protective colloids.

The invention furthermore relates to powders consisting of porous or non-porous spherical particles which are prepared by the process according to the invention and have a narrow particle size range which can be set at between 0.1 and 300 $\mu$m.

Further details are given in Example 1.

Figure 3:
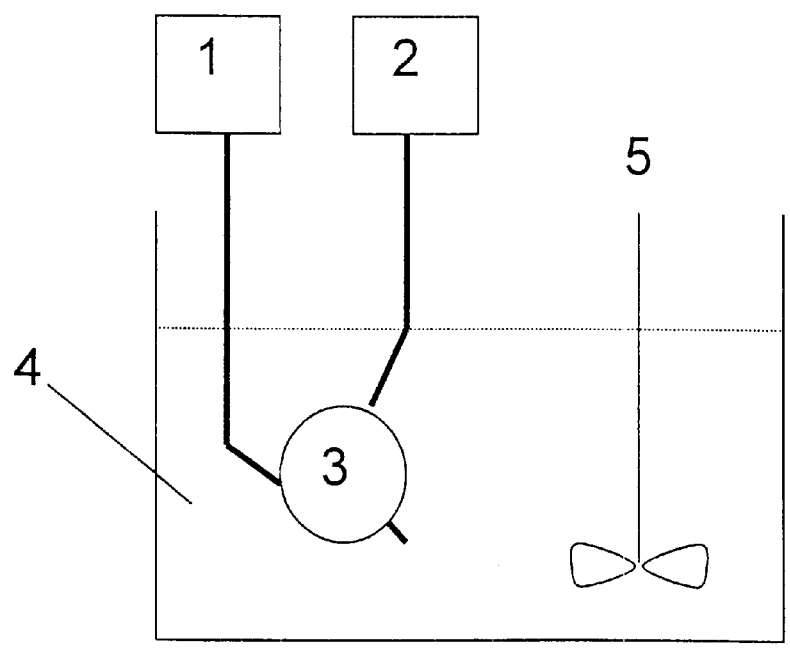

FIG. 3 shows a reaction plant for the preparation according to the invention of porous spherical silica gel. Further details are given in Example 2.

Figure 4:
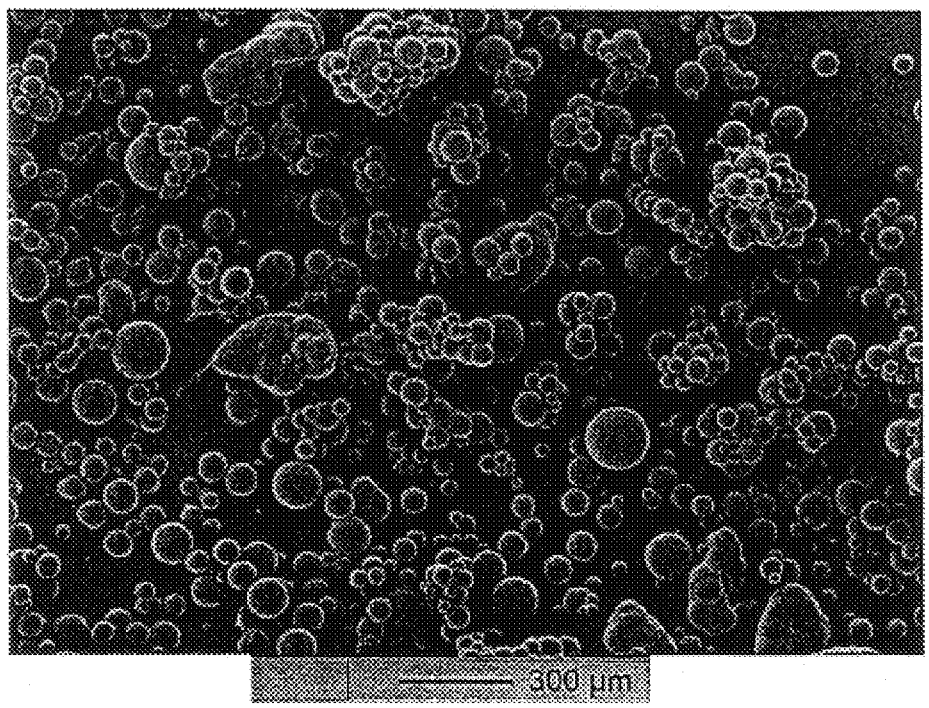
Figure 5:
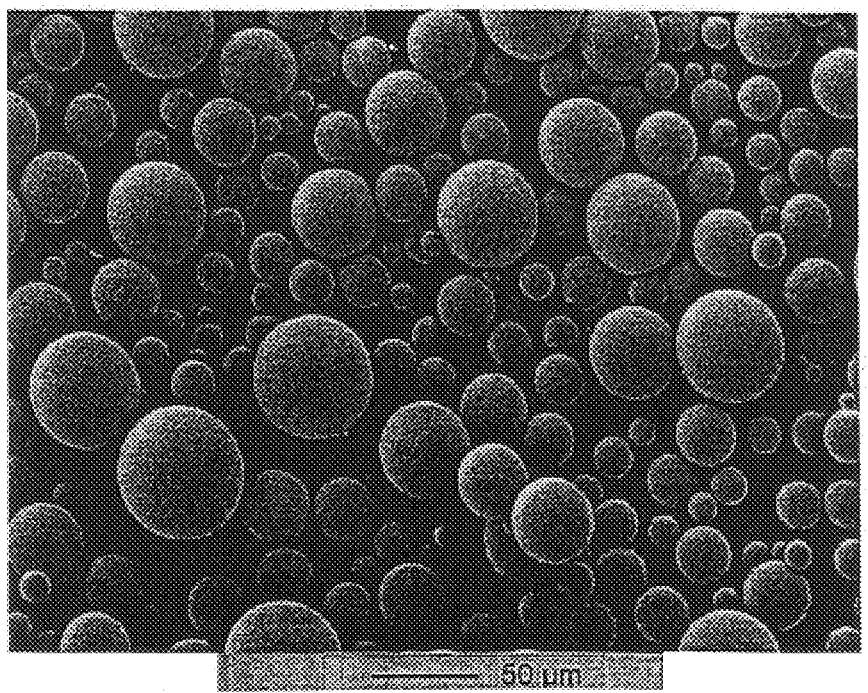
Figure 6:
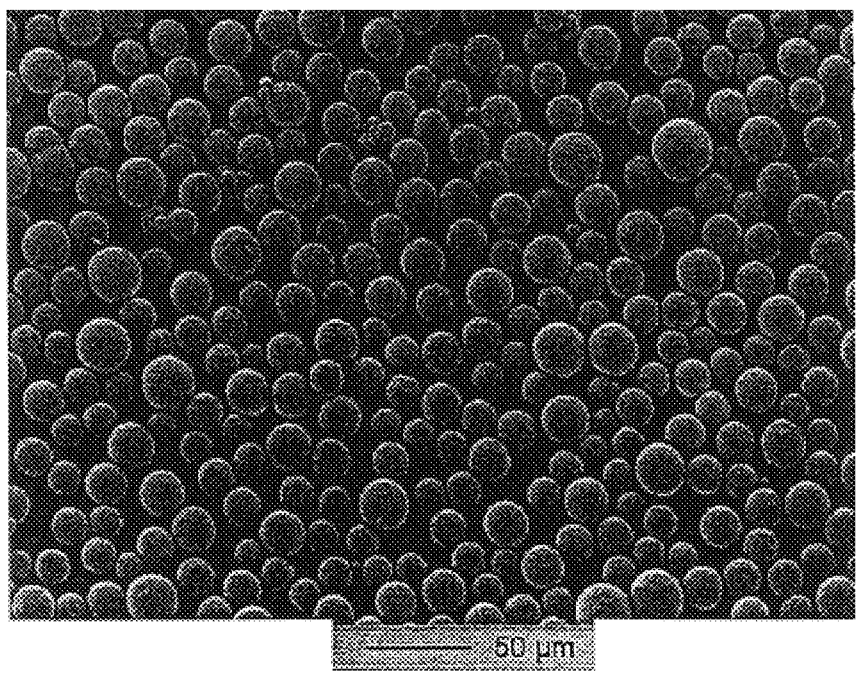

FIGS. 4, 5 and 6 compare the quality of particles prepared by the conventional stirred-tank process and by the process according to the invention.

Particle sizes and particle size distribution can be determined by various methods, with which either a number distribution or a mass distribution can be determined. These methods are, for example, various types of sieving (dry sieving, wet sieving, microsieving), sedimentation (sedimentation in the gravitational field, sedimentation in the centrifugal field), microscopic analysis, measurements in a Coulter counter and light scattering. For speed, reproducibility and accuracy, preference is given to measurement of light scattering, which can be used for a size range from 0.1 to 1000 $\mu$m.

For the assessment of a mass-based particle size distribution, a quality factor $Q_f$ is defined as follows:

$$Q_{f90} = (d_{95} - d_5)/d_{50}$$

where:

$d_x$ denotes the passage cumulative values for the particle size measured in each case (for example $d_{95} = 20$ $\mu$m means that 95% of the particles are smaller than 20 $\mu$m) and $Q_{fx}$ is the quality factor for x% of all particles.

Example: mean particle size $d_{50} = 10$ $\mu$m $d_{95} = 15$ $\mu$m $d_5 = 5$ $\mu$m This gives $Q_{f90} = (15-5)/10 = 1$.

A particle size distribution may be regarded as narrow if $Q_{f90}$ is <1.

The bead polymer powders prepared by conventional methods typically have particle size bands with $Q_{f90} > 1$. In addition, these methods frequently give powders which have a high fines content, i.e. a large number of very small particles. These fines contents have an adverse effect on the permeability and therefore have to be removed by complex sedimentation and sieving methods.

A very narrow particle size distribution for silica gel after sedimentation and sieving is found is Superspher® Si 100 particles from Merck KGaA.

$d_5$=3.2 μm
$d_{10}$=3.3 μm
$d_{50}$=4.1 μm
$d_{90}$=5.3 μm
$d_{95}$=5.6 μm

This gives $Q_{f90}$=0.59.

By contrast, the process according to the invention gives powders having a significantly narrower particle size distribution. The particle size bands with-out sedimentation or sieving have values of $Q_{f90}$<0.7, preferably $Q_{f90}$<0.5.

For example, $d_5$=14.7 μm
$d_{50}$=18.0 μm
$d_{95}$=22.5 μm were obtained.

This gives $Q_{f90}$=0.43.

Powders having such narrow particle size bands can be employed directly for most applications. The particle size distribution formed on use of the process according to the invention is narrower than formed by conventional methods in stirred-tank reactors including sedimentation and sieving. Particularly striking in powders prepared by the process according to the invention is the low fines content. The bead polymers produced in accordance with the invention are therefore preferably not classified. However, their quality can be further improved by a single sedimentation step.

For the purposes of the present invention, bead polymers are taken to mean homogeneously or heterogeneously crosslinked, swelling or non-swelling, porous or non-porous, organic or inorganic, essentially spherical networks. Bead polymers prepared by the process according to the invention can, for example, be formed by free-radical, ionic (anionic and cationic) or thermal polymerisation, for example of ethylenically unsaturated monomers, including living polymerisation, and by polycondensation or polyaddition. They can be, for example, poly(meth)acrylic acid derivatives, poly-(styrene-divinylbenzene) derivatives, polyesters, polyamides, silica gels or mixed oxides.

The polymerisation can be carried out in the homogeneous or heterogeneous phase under all conditions which result in polymerisation.

The performance of the polymerisations is known in principle to the person skilled in the art. An overview is given in Houben-Weyl, Volume XIV, makromolekulare Stoffe [Macromolecular Substances], Georg Thieme Verlag, Stuttgart.

Examples of polycondensation and polyaddition which may be mentioned are the preparation of polyesters and polyurethanes, as well as the preparation of silica gel.

The process according to the invention is particularly preferably used for free-radical polymerisation and in particular for polycondensation. These include solution, precipitation and preferably suspension and emulsion polymerisation, including mini, micro and inversive emulsion polymerisation. Free-radical polymerisation can be carried out using monomers such as, for example, mono- and diolefins having from 2 to 6 carbon atoms, such as ethylene, propylene or butadiene, monoethylenically unsaturated mono- or dicarboxylic acids having from 3 to 6 carbon atoms and derivatives thereof, such as acrylic acid, methacrylic acid, maleic acid, fumaric acid, itaconic acid, salts thereof and mono- or diesters thereof with $C_1$–$C_{18}$-alkanols or -diols, such as esters of acrylic acid or methacrylic acid with methanol, ethanol, n-propanol, isopropanol, n-butanol, isobutanol, sec-butanol, t-butanol, pentanol, hexanol, 2-ethylhexanol, octanol, decanol, dodecanol or stearyl alcohol, or amides and N-mono- or N,N-di-$C_1$–$C_{18}$-alkylamides or -hydroxyalkylamides thereof, such as acrylamide or methacrylamide, or acrylonitrile, methacrylonitrile, the vinyl ethers of glycerol, pentaerythritol and polysaccharides, such as cellulose, amylose and starch, and mono- and disubstituted vinyl ethers of alkyl, alkylaryl and aryl acid esters of cellulose and amylose, and analogous alkyl-, alkylaryl- and arylcarbamate derivatives, (meth)acrylonitrile, N-acryloyl and N-(meth)acryloyl derivatives of optically active amines, amino acids, amino acid esters and amino acid amides, such as N-acryloyl-(R)-2-phenylethylamine, N-methacryloyl-(S)-2-phenylethylamine; the optically active enantiomers of N-acryloyl and N-methacryloyl alkyl esters and mono-and dialkylamides of the 20 natural amino acids containing methyl, ethyl-, n-propyl and isobutyl as alkyl radicals, monoethylenically unsaturated sulfonic acids and/or salts thereof, such as the sodium salt of vinylsulfonic acid, acrylamidopropanesulfonic acid or the alkali metal salts thereof, or the sodium salt of sulfonated styrene, or vinylaromatic compounds, such as styrene or α-methylstyrene, or vinyl-$C_1$–$C_{18}$-alkyl ethers, such as vinyl ethyl ether, or vinyl-$C_1$–$C_{18}$-alkyl esters, such as vinyl acetate or vinyl propionate, or N-vinyllactams, such as N-vinylpyrrolidone, or vinyl halides, such as vinyl chloride or vinylidene chloride, or vinylaromatic compounds, such as vinylpyridine or α-phenylstyrene, and mixtures of different monomers of one type and/or different types.

Crosslinking agents which can be used, besides the above-mentioned mono- and diesters of a monoethylenically unsaturated $C_3$–$C_6$-mono- or dicarboxylic acid with a $C_1$–$C_{18}$-hydroxyalkanol or -diol or N-mono- or N,N-di-$C_1$–$C_{18}$-alkylamide, are the divinyl esters of an aliphatic or aromatic $C_1$–$C_{18}$-dicarboxylic acid, the N,N-diacryloyl or N,N-dimethacroyl derivatives of aliphatic or aromatic $C_1$–$C_{18}$-diamines, if desired in their enantiomerically pure form, the divinyl esters of tartaric acid and of substituted tartaric acid, the N,N'-diacrylamides of 1,2-diphenylethylenediamine in enantiomerically pure form or as diastereomers, divinylethyleneurea and derivatives thereof, divinylbenzene or silicon-containing crosslinking agents and the like. The type and amount of the crosslinking agents essentially determine the degree of crosslinking and the type of porosity resulting therefrom. Both crosslinked, swelling-porous gels and permanently porous materials having a broad pore range of 0–500 nm, preferably permanently porous materials having an upper exclusion limit for linear polystyrenes having an entanglement diameter of 5–100 nm can be formed.

Further monomers and crosslinking agents and their use are known in large number to the person skilled in the art.

Conventional regulators for molecular weight control that can be employed are, for example, mercapto compounds, such as mercaptoethanol, mercaptopropanol, mercaptobutanol, mercaptoacetic acid, mercaptopropionic acid, mercaptotrimethoxysilane, butyl mercaptan or t-dodecyl mercaptan, or alternatively organohalogen compounds, such as tetrachloromethane or bromotrichloromethane, with a proportion of from 0.01 to 5% by weight, based on the amount of monomer.

Suitable free-radical polymerisation initiators are all substances which are capable of initiating free-radical polymerisations. Typical free-radical polymerisation initiators are both alkali metal peroxodisulfates, peroxides, as described, for example, in Kunststoffe 80, pp. 830–837, 1990, and azo compounds. Just as suitable for a polymerisation according to the invention are initiators which are composed of at least one organic or inorganic oxidant, preferably a peroxide and/or hydroperoxide, and at least one organic or inorganic reducing agent. The amount of initiator is usually between 0.01 and 5% by weight, preferably from 0.1 to 2% by weight, of the total amount of monomer.

In particularly preferred embodiments of the polymerisation according to the invention, the addition of emulsifiers or protective colloids is unnecessary. This overcomes the main hurdle in the preparation of disperse emulsion or suspension polymers, since complex and expensive purification steps for the removal of the emulsifiers are totally superfluous. Particular preference is therefore given to carrying out the reaction without the use of emulsifiers or protective colloids in the preparation of homogeneously and heterogeneously crosslinked styrene-divinylbenzenes, homogeneously and heterogeneously crosslinked vinyl acetate-divinyladipic acid supports, homogeneously and heterogeneously crosslinked vinyl acetate-divinylethyleneurea supports, homogeneously and heterogeneously crosslinked vinyl acetate-N,N'-ethylenebisacrylamide, silica gels, titanium oxide, zirconium oxide and aluminium oxide particles, as well as porous particles comprising the trisubstituted alkyl-, alkylaryl- and arylcarboxylic acid esters of carbohydrates, especially of the corresponding cellulose and amylose derivatives; and of trisubstituted alkyl-, alkylaryl- and arylcarbamates of polysaccharides, particularly cellulose and amylose tris(3,5-dimethylphenylcarbamate). Should emulsifiers or protective colloids nevertheless be added in some cases, amounts of up to 10 per cent by weight, preferably 0.5–5% by weight and particularly preferably from 0.5 to 3% by weight, based on the monomers to be polymerised, are usually employed. Suitable protective colloids are, for example, polyvinyl alcohols, cellulose derivatives, polyalcohols, cellulose derivatives or copolymers based on vinylpyrrolidone. Suitable emulsifiers are, in particular, anionic and nonionic emulsifiers, such as ethoxylated mono-, di- and trialkylphenols, ethoxylates of long-chain alcohols, alkali metal and ammonium salts of alkylsulfonic acids and of alkylarylsulfonic acids. A detailed description is given in Houben-Weyl, Methoden der Organischen Chemie [Methods of Organic Chemistry], Georg-Thieme Verlag, Volume XIV/1, 192–208 or 411–420, 1961.

In the preparation of porous polymer particles by emulsion polymerisation, the pore formation may be influenced by suitable precipitants. Typical precipitants are alkyl compounds or alkyl alcohols having from 6 to 30 carbon atoms, preferably 6–12 carbon atoms.

Inorganic monomers that may be mentioned for the polycondensations and polyadditions are, in particular, the esters, carbides, nitrides and alkyl compounds of the transition metals from the 3rd, 4th and 5th main group and sub-group. Preference is given to the alkyl, aryl and polyesters of aluminium, boron, silicon, titanium and zirconium. Particular preference is given to the $C_1$–$C_{10}$-esters and substituted esters and polyesters of silicon, titanium, zirconium, aluminium and boron, as well as alkoxyalkyldisilanes.

In the preparation of non-porous and/or porous inorganic oxides, carboxy-carbides and nitrides, use is preferably made of the said monomers and precondensed condensation products thereof having an element content of between 15 and 70 per cent by weight. Preferred examples of such starting compounds are tetraethoxysilane, polyethoxysilane, for example PES® 28 or PES® 40 from Wacker, Burghausen, tetraethoxy titanate, etc.

The porous or non-porous silica gels are typically prepared in accordance with the invention using tetraalkoxysilanes, i.e. all hydrolysable silicic acid orthoesters of aliphatic alcohols, such as, for example, the esters of aliphatic alcohols having 1–10 carbon atoms, for example methanol, ethanol, n- or i-propanol, and the isomeric butanols and pentanols. These can be employed individually or in the form of a mixture. Preference is given to the silicic acid orthoesters of $C_1$–$C_3$-alcohols, in particular tetraethoxysilane. The porous particles can be produced additionally using trialkoxysilanes of the formula I

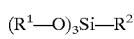   I in which $R^1$ is $C_1$–$C_{10}$-alkyl $R^2$ is $C_5$–$C_{25}$-alkyl, $C_6$–$C_{14}$-aryl, $C_7$–$C_{25}$-alkylaryl or $C_7$–$C_{25}$-arylalkyl.

$R^2$ is preferably $C_6$–$C_{20}$-n-alkyl.

The tetraalkoxysilanes are preferably employed in a 3- to 250-fold molar excess, based on the silanes of the formula I. Further details, in particular regarding how the pores produced primarily can be widened, are given in WO 97/07056 and the literature cited therein.

In particular for chromatography, the surfaces of the $SiO_2$ particles are frequently derivatised to make them suitable for various separation methods. For example, vinyl groups, 2,3-dihydroxypropyl groups, 3-aminopropyl groups or octadecyl groups are introduced. Suitable silanes for these reactions and processes for the derivatisation of the $SiO_2$ surface are known to the person skilled in the art and are compiled in common handbooks, for example Porous Silica (K. K. Unger, Elsevier, 1979).

Suitable as the alcohol component are aliphatic $C_1$–$C_5$-alcohols, preferably $C_1$–$C_3$-alcohols, such as methanol, ethanol, i-propanol and n-propanol. These can be used individually or alternatively in the form of a mixture with one another.

It has proven particularly advantageous to carry out the polymerisation at a reaction temperature of 5–250° C., in particular at 5–150° C., preferably at 30–150° C. and particularly preferably at 50–100° C. The preferred temperature range for the polycondensation is between 0 and 30° C. The polymerisation can be carried out at atmospheric pressure or under superatmospheric pressure.

The reactions are preferably carried out by passing the continuous phase, generally water or water/alcohol or water/organic solvent, continuously through the micromixer at a defined volume flow rate. Alcohols in this case are water-miscible alcohols, such as methanol, ethanol, propanol, etc.; the organic solvents should also be miscible with water. These are, for example, dimethyl sulfoxide, N,N-dimethylformamide, N-methylpyrrolidone, tetrahydrofuran, acetonitrile and dioxane.

The heterogeneous phase (typically a water-immiscible or only sparingly water-miscible alcohol or hydrocarbon), which contains the monomer or monomers and optionally auxiliaries (for example molecular weight regulators, emulsifiers, etc.), is subsequently fed in via the second feed, likewise at a defined, precisely set volume flow rate. The ratio of the two volume flow rates can be in a broad range and depends on the desired particle size, the type and distribution of the particle sizes, the viscosity of the homogeneous and heterogeneous phase, depending on the reaction temperature and the reaction kinetics and the requisite ratio of the inert components in the final mixture for achieving a suitable pore structure. The ratio between the volume flow rates of the continuous and heterogeneous phases (continuous:heterogeneous) is preferably from 1:10 to 100:1, in particular from 5:1 to 20:1.

It is likewise possible to reverse the procedure described above. For example, hydrophilic monomers are polymerised by passing them over the aqueous phase. An example thereof is a process for the preparation of silica gels in which emulsions of water-glass in water/heptane or other immiscible solvents are condensed in acidic solution. This process is particularly suitable for the inexpensive preparation of silica gel particles which may contain impurities of, for example, alkali metal salts.

The monomer present in the aqueous phase is, for example,.an aqueous silicic acid solution (water-glass). It is also possible for other suitable inorganic compounds, such as titanates, aluminates or zirconates, to be present in the aqueous phase as monomers. The micromixer then emulsifies the aqueous phase with an immiscible second phase. The second phase is usually formed by an organic solvent, such as straight-chain or branched $C_5$–$C_{10}$-alkanes or mixtures thereof. Other solvents are also suitable. However, it must be remembered that the organic solvent has to be removed again subsequently. It should therefore be sufficiently volatile. The resultant emulsion is then passed into a reaction system comprising a suitable, preferably acidic catalyst and gelled. Examples of reaction conditions are given, for example, in Porous Silica (K. K. Unger, Elsevier, 1979).

Suitable mixers for the polymerisation according to the invention are static micromixers. In these mixers, the spatial distribution of two components to be mixed is influenced by the flow management, for example by separation and recombination, twisting, distortion and widening, utilising the flow energy, in such a way that large interfaces are formed for diffusive exchange between the components. Various mixers and their structure are known. For example, systems of this type are described in Phtt. Gravesen et al., Proceedings of IEEE MEMS 96, 1996, San Diego; V. Hessel et al., Proc. Int. Symp. on Microsystems, Intelligent Materials and Robots, Sendai, Japan, 1995, 45; Schwesinger et al., J. Micromech. Microeng. 1996, 6, 99; R. W. Wegeng et al., Proceedings of 1996 Spring National Meeting AIChE, New Orleans, 1996, 1; A. E. Gruber et al., "IR-spectroscopic Studies of a Chemical Reaction in Various Micromixer Designs", Second Int. Conf. on Microreaction Technology, New Orleans, USA, Mar. 8–12 1998, or in H. Löwe et al., "Micromixing Technology" written review for presentation at IMRET 4, $4^{th}$ International Conference on Microreaction Technology, Atlanta, Mar. 5–9 2000.

For the preparation of the bead polymers according to the invention, particular preference is given to the LIGA micromixing system (micromixer) from IMM (Institut für Mikrotechnik Mainz GmbH). In this high-performance mixer, two liquid streams are transported in opposite directions to one another in specially shaped microchannels in a mixing unit and subsequently discharged through a slot perpendicular to the flow direction. The walls of the microchannels wind sinusoidally in order to increase the contact area of the two streams. Through,this structure, two liquid streams or liquid and gas streams are mixed by diffusion within seconds to milliseconds. These mixers are available in various designs, enabling a mixer to be selected depending on the synthetic requirements.

Depending on the application, for example on use of solutions of higher viscosity, it may, however, be advantageous to use other types of mixer. For industrial applications in which mass production is the aim, caterpillar or onion mixers, as available, for example, from IMM (Institut für Mikrotechnik Mainz GmbH, Germany), are particularly suitable. In contrast to the LIGA micromixing system, the caterpillar mixer has, for example, a total of only two channels. The design of the mixer enables a significantly higher flow rate to be achieved. In addition, cleaning of the channels is simplified. The onion mixer has a shell-like channel structure. This likewise has the advantage of higher productivity and easier cleaning.

In the bead polymer preparation according to the invention, two or more liquid streams of suitable immiscible or sparingly miscible component solutions are dispersed in the mixer and subsequently polymerised. The high shear forces result in the formation of droplets having a relatively narrow particle size distribution. This results in the need to add emulsifiers during the preparation of bead polymers or subsequently to classify the bead polymers with respect to their particle size distribution being superfluous for the first time.

The size of the resultant particles can be influenced firstly by varying the channel sizes and secondly through the flow rates of the sub-streams. The smaller the channel size and the greater the flow rate, the smaller the resultant particles. In this way, particles according to the invention having narrow particle sizes which can be set to a specific value of between 0.1 and 300 $\mu$m, preferably between 1 and 100 $\mu$m, particularly preferably between 1 and 20 $\mu$m, can be produced.

The process is particularly advantageous for the production of particles having a narrow particle size range of between 5 and 50 $\mu$m, in particular between 10 and 50 $\mu$m, since it has hitherto only been possible to produce particles in these size ranges with a very broad particle size distribution.

A further important reaction parameter is the viscosity. The higher the viscosity of the heterogeneous phase, the more shear forces have to be used in order to achieve a certain low particle size.

In order to produce certain pore structures in the polymerisation according to the invention, the reaction conditions known from batch processes can be applied directly. Examples of reaction conditions are given, for example, in Porous Silica (K. K. Unger, Elsevier, 1979).

In addition, it has been found that the pore volume of the particles can be influenced directly in the silica gel preparation according to the invention by varying the ammonia concentration in the initially introduced solution (for example solution 3, Example 2). For example, the pore volume can be set to a range between 0.7 and 0.9 using ammonia concentrations that are twice as high as the concentrations usually used in batch processes. The mechanical properties of the silica gel produced in accordance with the invention are thereby greatly improved compared with silica gels produced in a conventional manner. At the same time, the parameters of surface area and pore size which are important for the chromatographic properties remain virtually unchanged.

The establishment of the sub-streams and thus the parameters that are associated with the mixture of the components can be carried out by means of commercially available metering pumps.

For the bead polymerisation according to the invention, ancillary devices can be added to the micromixer. These may be, in accordance with the invention, one or more further upstream or downstream micromixers, hold-up loops or tubular reactors, heat exchangers, reaction vessels, devices for the introduction of further liquids or gases and devices for sampling or detection installed in parallel and/or in series.

The micromixer is preferably provided with an upstream or downstream delay loop and a heat exchanger so that the feed of the solutions to the mixer and the temperature as well as the reaction after the particle formation can be controlled and monitored very precisely.

In particular for the production of relatively large particles, a reaction vessel is preferably installed downstream of the micromixer. In this way, the restriction of the achievable particle size, as is the case due to the through-flow reactor in DE 196 34 450 for example, is avoided.

Figure 2:
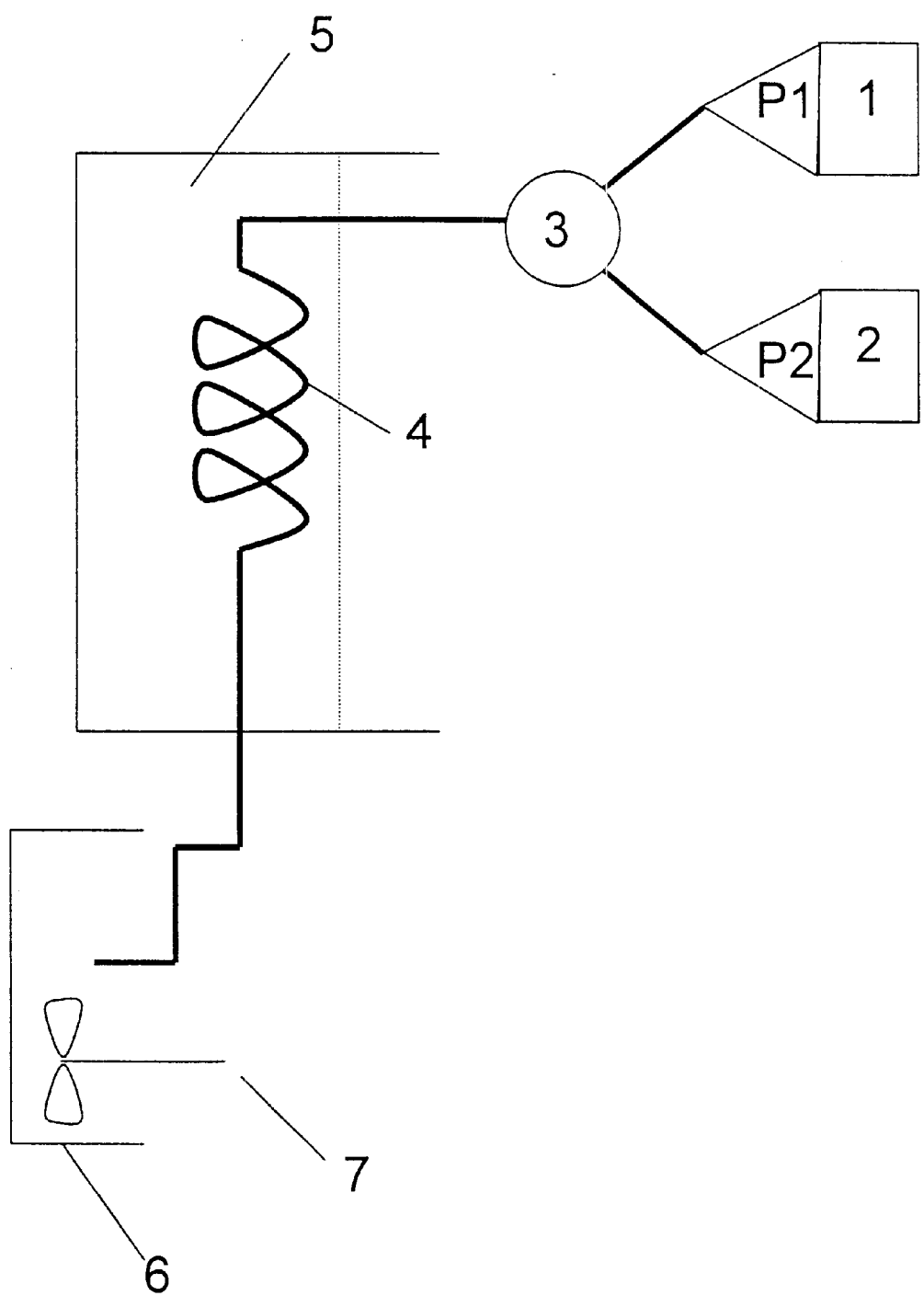
FIG. 2 shows a reaction plant for the preparation in accordance with the invention of heterogeneously crosslinked styrene-divinylbenzene.

The process according to the invention is universally applicable to all types of polymerisation in which polymers are formed from pre-formed spherical droplets. A very wide variety of ancillary devices or reactors which are suitable for the corresponding polymerisation can therefore be installed downstream of the formation of the spherical particles with the aid of the micromixer. In this way, the process according to the invention offers the possibility of converting bead polymerisation from batch operation, which is difficult to control, into a continuous process. The apparatuses necessary are significantly smaller; by carrying out the process in a specific way, fewer by-products needing disposal are formed. After only brief optimisation of the reaction conditions, particle band ranges are formed in which sieving, classification or sedimentation is no longer necessary for most applications. By comparison, such broad particle size bands are formed in the stirred-tank method as shown in FIGS. 2 and 3 that a yield of only about 30% by weight remains after sieving and/or sedimentation in order to obtain a narrow particle size distribution. The yield of target particle size bands is virtually 100% in the process according to the invention.

The particles produced by the process according to the invention are thus very suitable for use in all known applications of monodisperse particles. In particular, they are suitable for applications in the area of chromatography, such as, for example, HPLC or capillary electrophoresis. Inorganic particles, especially silica gel particles, having the narrow particle size distribution according to the invention. are ideal as added substances for cosmetic creams and the like. The particles produced in accordance with the invention are also suitable as spacers or calibration substances.

Figure 1:
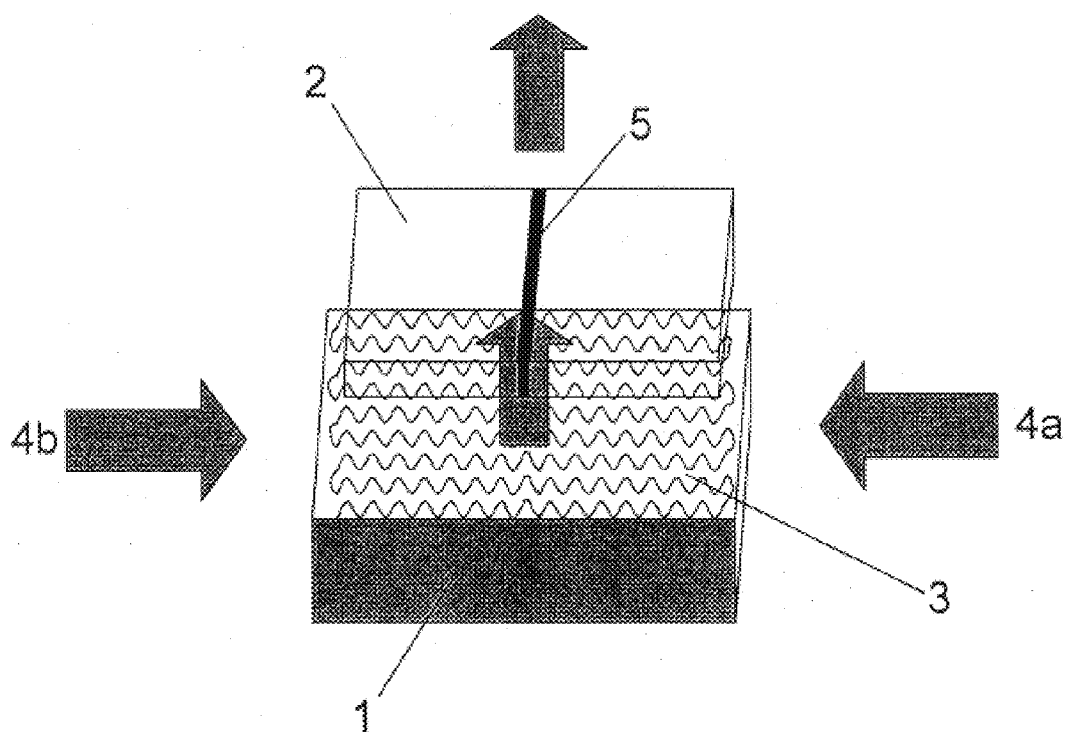
FIG. 1 shows the structure of a micromixer employed in accordance with the invention.

FIG. 1 shows a diagrammatic view of the structure of a micromixer from IMM. The apparatus consists of a base plate (1) and a cover plate (2) which are connected to the inlets and outlets. The mixing element contains a layer of 15 or 18 sinusoidally shaped channels (3) having a width of 25 or 40 μm. On entry of the two component streams (4a and 4b) into the mixing unit, these are divided into smaller sub-streams, which, due to the channel structure, do not meet immediately, but pass into the centre of the unit (multilamination). The contact area is limited by a slot (5) on the upper side of the mixing unit, through which the mixture exits from the mixer.

Besides an individual mixing unit, it is also possible, for greater throughput, to use a micromixer array, for example consisting of 10 mixer sub-units. This arrangement comes under the term micromixer in accordance with the invention.

FIGS. 2 and 3 are explained in greater detail in Examples 1 and 2.

FIG. 4 shows a typical result of a polymerisation carried out in a conventional stirred-tank reactor. Both large and a very large number of small particles are present.

FIG. 5 shows polymerisation products of the same chemical composition as the particles from FIG. 2, again originating from conventional stirred-tank batches. This particle size distribution was obtained after sieving and double sedimentation for removal of fine fractions.

FIG. 6 shows the result of a polymerisation carried out in accordance with the invention. The readily evident very narrow particle size distribution was obtained directly and without further classification.

Even without further details, it is assumed that a person skilled in the art will be able to use the above description in the broadest scope. The preferred embodiments and examples should therefore be regarded merely as descriptive disclosure, which is in no way limiting in any way.

The complete disclosure content of all applications, patents and publications mentioned above and below, and of the corresponding application DE 99 20 794, filed on 06.05.1999, is incorporated into this application by way of reference.

EXAMPLE

All syntheses were carried out using the micromixer, channel width 40 μm (type A7) from IMM.

Example 1

Preparation of a Heterogeneous, Crosslinked Styrene-divinylbenzene

Experimental Set-up:

The apparatus corresponds to the set-up in FIG. 2, assembled from the stock tanks (1) and (2) for the homogeneous and heterogeneous phases, two constant-flow piston feed pumps P1 and P2, the high-performance mixer (3) and a tubular reactor (4) as post-reaction zone, assembled from three sections with different internal diameters (section a: 2 mm internal diameter, length 10 m; section b: 5 mm internal diameter, length 10 m; section c: 10 mm internal diameter, length 10 m). The tubular reactor is arranged with a downward inclination and runs into the stirred tank (6) with stirrer (7). It can be set to a reaction temperature above the initiator temperature (typically >65° C.) by means of a thermostat (5). At the beginning of the reaction, the mixer is always filled with homogeneous phase. The pumps P1 and P2 are always started in the sequence of feed of homogeneous phase before heterogeneous phase.

Experimental Procedure:

Preparation of a material having a pore size of 10 nm and a mean particle size of between 20 and 40 μm.

The stock tanks (1) and (2), each filled with the heterogeneous phase (reaction mixture comprising monomer, crosslinking agent and free-radical initiator) and homogeneous phase (water and optionally emulsifier), are warmed to an initial temperature of 40° C. and metered into the mixer (3) at a constant flow rate (1:10, v/v). The post-reaction zone (4) is warmed to 85° C. A stirred tank (10 l) (6) which is constantly stirred at low speed by means of a blade stirrer (7), is located at the end of the tubular reactor (4).

Reaction Batch:

a) With Emulsifier

Solution 1: styrene
divinylbenzene
0.2% by weight of azoisobutyronitrile

Styrene and divinylbenzene are employed in the ratio 1:1.

Solution 2: water
0.2% by weight of Tween 80®

Solution 1/solution 2 ratio==1:10 b) Without Emulsifier

Set-up and composition as under a), but without emulsifier in solution 2

2. Example 2

Preparation of a Porous, Spherical Silica Gel a) Preparation of Polyethoxysilane 400 g of TES® 40 (a tetraethoxysilane) are introduced into a dry 2 l round-bottomed flask, and 200 g of ethanol are added with stirring. The mixture is held at 25° C. for 20 minutes. 0.5 ml of thionyl chloride is then added. 60 g of deionised water (25° C.) are subsequently added dropwise over the course of from 10 to 12 minutes, the mixture is then stirred for a further 30 minutes, the ethanol is stripped off at 100 mbar, the water bath is heated from 25° C. to 60° C. in 10° C./30 minute steps, the pressure is reduced to 30 mbar, and the mixture is evaporated until 1.16 g of polyethoxysilane are obtained.

b) Preparation of the Silica Gel

Solution 1: 16.7 g of polyethoxysilane
6 g of dimethylformamide (99%)

Solution 2: water/2-propanol (64/36, v/v)

Solution 3: 25% ammonia, diluted 1:50 with water

Total volume flow rate: 20 ml/min;

Solution 1/solution 2=1:15 →particle size about 5 µm
1:10 →particle size about 10 µm Experimental Procedure:

The homogeneous phase and the heterogeneous phase from the stock tanks (1) and (2) are combined in the mixer (3) as specified in the predetermined volume ratio. The mixer (3) is arranged above the stirred tank (4) (volume 10 l) in such a way that the suspension drips into the trombus of the reaction liquid (solution 3).

As a variant of the experimental set-up, the mixer (3) can, as shown in FIG. 3, be immersed in the reaction vessel (4). With constant stirring (5), the reaction suspension is fed in directly from the mixer.

Example 3

Preparation of a Spherical, Porous Cellulose Derivative

Solution 1: 12 g of cellulose tribenzoate
150 ml of dichloromethane

Solution 2: water

Solution 3: water

Solution 4: methanol

Total volume flow rate (solution 1 and 2): 11 ml/min;

Volume flow rate (solution 3): about 100 ml/min

Solution 1/solution 2 ratio=1:10

In order to prevent premature precipitation of the cellulose ester from the cellulose ester/dichloromethane suspension on initial contact with the precipitation liquid methanol (solution 4), the mixer output is not fed directly into the precipitation liquid. The mixer outlet is surrounded concentrically by a tube (tube in tube), from which water (solution 3) is pumped by a third reaction pump at a very much greater volume flow rate. This liquid flow surrounding the outlet tube concentrically reduces the concentration of the cellulose ester/dichloromethane suspension in water by at least ten fold. This dilute suspension is then fed into the precipitation liquid methanol. In order that the methanol concentration of the precipitation solution remains the same, the reaction mixture is replaced by the precipitation liquid at a constant feed ratio.

What is claimed is:

1. A process for preparing a porous or non-porous bead polymer, which comprises mixing, emulsifying and reacting at least two liquid streams of immiscible or sparingly miscible component solutions wherein said components are mixed and emulsified in a static micromixer and reacted directly in and/or subsequent to the micromixer.

2. The process of claim 1, wherein one or more additional identical and/or different process steps are conducted by ancillary devices installed upstream and/or downstream of the micromixer.

3. The process of claim 1, wherein the component solutions contain neither emulsifiers nor protective colloids.

4. The process of claim 1, wherein the porous or non-porous bead polymer product has a particle size range of between 0.1 and 300 µm.

5. The process of claim 1, wherein the porous or non-porous bead polymer product has a particle size range of between 1 and 100 µm.

6. The process of claim 1, wherein the porous or non-porous bead polymer product has a particle size range of between 1 and 20 µm.

7. The process of claim 1, wherein the porous or non-porous bead polymer product has a particle size range of between 5 and 50 µm.

8. The process of claim 1, wherein the porous or non-porous bead polymer product has a narrow particle size distribution such that its $Q_{f90}$ factor is <1.

9. The process of claim 1, wherein the components are reacted in a reactor separate and subsequent to being mixed and emulsified in the micromixer.

10. The process of claim 1, wherein the bead polymer product is heterogeneously crosslinked styrene-divinylbenzene.

11. The process of claim 1, wherein the bead polymer product is porous spherical silica gel.

12. The process of claim 1, wherein the bead polymer product is a poly(meth)acrylic acid derivative, poly(styrene-divinylbenzene) derivative, polyester, polyamide, silica gel or mixed oxide.

13. The process of claim 1, wherein the polymerization is by free-radical polymerization or polycondensation.

* * * * *